United States Patent [19]

Rao et al.

[11] Patent Number: 5,530,053
[45] Date of Patent: Jun. 25, 1996

[54] LIQUID TONERS UTILIZING HIGHLY FLUORINATED SOLVENTS

[75] Inventors: S. Prabhakara Rao, Maplewood; Terrance P. Smith, Woodbury, both of Minn.

[73] Assignee: Minnesota Mining and Manufacturing Company, St. Paul, Minn.

[21] Appl. No.: 449,233

[22] Filed: May 24, 1995

Related U.S. Application Data

[62] Division of Ser. No. 243,923, May 17, 1994.

[51] Int. Cl.$^6$ .................................................. G03G 9/13
[52] U.S. Cl. .................... 524/462; 524/463; 524/544; 524/758; 524/795; 524/796; 430/113; 430/114; 430/115; 430/116
[58] Field of Search ........................... 524/462, 463, 524/544, 758, 795, 796

[56] References Cited

U.S. PATENT DOCUMENTS

| | | | |
|---|---|---|---|
| 2,297,691 | 10/1942 | Carlson | 430/55 |
| 2,752,833 | 7/1956 | Jacob | 355/20 |
| 2,986,466 | 5/1961 | Kaprelian | 430/44 |
| 3,344,098 | 9/1967 | Horiguchi et al. | 524/460 |
| 3,553,133 | 1/1971 | Olson | 430/106 |
| 3,690,756 | 9/1972 | Smith | 355/327 |
| 3,743,503 | 7/1973 | Goldman et al. | 430/119 |
| 3,753,760 | 8/1973 | Kosel | 430/119 |
| 3,900,412 | 8/1975 | Kosel | 430/114 |
| 3,991,226 | 11/1976 | Kosel | 430/119 |
| 4,268,598 | 5/1981 | Leseman et al. | 430/106.6 |
| 4,321,404 | 3/1982 | Williams et al. | 560/115 |
| 4,370,047 | 1/1983 | Damouth et al. | 355/327 |
| 4,403,848 | 9/1983 | Snelling | 35/327 |
| 4,467,334 | 8/1984 | Anzai | 347/118 |
| 4,564,574 | 1/1986 | Uytterhoeven et al. | 430/115 |
| 4,614,521 | 9/1986 | Niwa et al. | 8/471 |
| 4,619,990 | 10/1986 | Elmasry | 534/573 |
| 4,728,983 | 3/1988 | Zwadlo et al. | 347/119 |
| 4,778,472 | 10/1988 | Ong et al. | 430/106 |
| 4,795,794 | 1/1989 | Winnik et al. | 526/259 |
| 4,880,432 | 11/1989 | Egan et al. | 8/647 |
| 4,909,806 | 3/1990 | Garbe | 8/647 |
| 5,030,701 | 7/1991 | Garbe | 526/245 |
| 5,063,132 | 11/1991 | Pierce et al. | 430/109 |
| 5,066,559 | 11/1991 | Elmasry et al. | 430/111 |
| 5,166,326 | 11/1992 | Smith et al. | 534/701 |
| 5,200,290 | 4/1993 | Ong et al. | 430/113 |
| 5,230,733 | 7/1993 | Pawlowski | 106/27 R |
| 5,283,148 | 2/1994 | Rao | 530/114 |

FOREIGN PATENT DOCUMENTS

| | | |
|---|---|---|
| 0546856A2 | 11/1992 | European Pat. Off. |
| 48-8562 | 3/1973 | Japan. |
| 59-050449 | 3/1984 | Japan. |
| 63-314285 | 12/1988 | Japan. |
| 6902194 | 8/1969 | Netherlands. |
| 1305623 | 4/1987 | U.S.S.R. |
| 1167161 | 10/1969 | United Kingdom. |
| 1181287 | 2/1970 | United Kingdom. |
| 1220450 | 1/1971 | United Kingdom. |
| 1314423 | 4/1973 | United Kingdom. |
| 1377067 | 12/1974 | United Kingdom. |

OTHER PUBLICATIONS

R. S. Asquith, H. S. Blair, A. A. Crangle, E. Riordan, *Self-colored Polymers Based on Anthraquinones*, Journal of the Society of Dyers and Colourists; Apr., 1977; pp. 114–125.

Lord, M. W.; Peters, A. T.; *J. Chem. Soc., Perkins Trans.*, 1, (20) 2305–8.

Matsumoto, S.; Kubodera, K.; Kaino, T., *Appl. Phys. Lett.* 51, 1, (1987).

Schmidt, S. P.; Larson, J. R.; Bhattacharya, R. in *Handbook of Imaging Materials*, Diamond, A. S.; Ed., Marcel Dekker, New York, 1991, pp. 227–252.

Lehmbeck, D. R. in *Neblette's Handbook of Photography and Reprography*, Sturge, J., Ed., Van Nostrand Reinhold, N.Y., 1977, Chapter 13, pp. 331–387.

Ito et al., *Macromolecules* 1982, 915–20.
Ito et al., *Macromolecules* 1984, 17, 2204–5.

*Primary Examiner*—Mark Nagumo
*Attorney, Agent, or Firm*—Gary L. Griswold; Walter N. Kirn; Susan Moeller Zerull

[57] ABSTRACT

Electrostatic toners comprising polymeric dyes comprising of (1) discrete segments that are dispersible in highly fluorinated solvents and (2) discrete color-imparting segments. These toners can be prepared by a means of a polymerization process, wherein macromers containing highly fluorinated dispersible segments are grafted onto a polymer having chromophores attached thereto.

44 Claims, No Drawings

LIQUID TONERS UTILIZING HIGHLY FLUORINATED SOLVENTS

This is a division of application Ser. No. 08/243,923, filed May 17, 1994.

BACKGROUND OF THE INVENTION

1. Field of the Invention

This invention relates to liquid toners that are useful for electrographic and electrophotographic processes.

2. Discussion of the Art

A general discussion of color electrophotography is presented in R.M. Schaffert, *Electrophotography*, Focal. Press, London & New York, 1975, pp. 178–190. Electrophotographic systems are systems in which a toner is deposited on a charged surface and subsequently transferred to a receiving sheet. Electrophotographic systems employing liquid toners are well known in the imaging art. See, for example, Schmidt, S. P.; Larson, J. R.; Bhattacharya, R. in *Handbook of Imaging Materials*, Diamond, A. S., Ed., Marcel Dekker, New York, 1991, pp. 227–252 or Lehmbeck, D. R. in *Neblette's Handbook of Photography and Reprography*, Sturge, J., Ed., Van Nostrand Reinhold, New York, 1977, Chapter 13, pp. 331–387. A liquid toner is a dispersion of small, e.g., colloidal particles in a dispersing medium having a low dielectric constant. The particles usually comprise a colorant, typically a pigment, and a film-forming resin and carry an electrostatic charge. The particles in the dispersion are capable of migrating under the influence of an electric field and being deposited on a surface bearing an imagewise distribution of opposite charge, thereby forming an image.

In most instances, the preferred dispersing medium has been a hydrocarbon having a high flash point, which hydrocarbon has both a low dielectric constant, e.g., less than 3, and a vapor pressure sufficiently high to ensure rapid evaporation of the dispersing medium following deposition of the toner onto a photoconductive drum, transfer belt, and/or receptor sheet. Rapid evaporation is particularly important for cases in which multiple colors are sequentially deposited and/or transferred to form a single image. Examples of such commercially available dispersing media include members of the family of solvents having the trade designation "ISOPAR" (boiling point range: 130°–160° C.).

There are significant drawbacks to the use of toners employing hydrocarbon dispersing media. These drawbacks include (a) adequate evaporation rates for high speed imaging applications, (b) low flash points (hydrocarbon solvents having boiling points below 120° C. typically have flash points below 40° C.), (c) environmental pollution, and (d) toxicity. Chlorinated hydrocarbons, a subgenus of hydrocarbons, are undesirable from the standpoint of atmospheric pollution. It would be advantageous to employ a dispersing medium having a higher evaporation rate, lower pollution effects, lower flammability, and lower toxicity than those of ordinary hydrocarbon solvents. Chlorofluorocarbon solvents (e.g., "FREON-113" solvent) have been employed as dispersing media for electrophotographic liquid toner dispersions. See, for example, Soviet Pat. No. 1,305,623. However, chlorofluorocarbon solvents of this type are likely to be banned because they are believed to cause ozone depletion in the stratosphere, on account of formation of chlorine monoxide, a free radical that is capable of destroying ozone.

One class of solvents that addresses some of the aforementioned problems are highly fluorinated, preferably perfluorinated, solvents, such as the "FLUORINERT" solvents (available from Minnesota Mining and Manufacturing Company), hexafluorobenzene, and so on. These solvents have many desirable physical properties that make them useful in electrophotographic applications employing liquid toner dispersions. However, they suffer from the shortcoming of being unable to dissolve or disperse most materials, including hydrocarbon-based materials. Thus, in order to develop an electrophotographic process employing highly fluorinated solvents, it is necessary to develop stable solutions or dispersions of colorant and charging agents. This can be accomplished by preparing polymers that are capable of being dispersed in those solvents that are also capable of dispersing dyes or pigments, and dispersing those polymers and dyes or pigments in those solvents, as described in U.S. Pat. No. 5,283,148, incorporated herein by reference. The fluorinated solvents described in that reference include perfluorinated species of alkanes, ethers, arenes, alkarenes, aralkanes, alkenes, and alkynes. The solvents may contain rings. Non-limiting examples of fluorinated solvents include perfluoroheptane, perfluorinated 2-butyltetrahydrofuran and mixtures thereof with perfluorooctane, perfluorohexane, perfluorotributylamine, perfluorotriamylamine, "FLUORINERT" solvents available from Minnesota Mining and Manufacturing Company, such as "FLUORINERT" solvents having the designations FC-84, FC-77, FC-104, FC-75, FC-40, FC-43, FC-70, FC-71, etc. It is recognized that many perfluorinated materials have residual amounts of hydrogen atoms that were not replaced by fluorine; however, it is anticipated that hydrogen atoms in the solvent are not deleterious provided that the total fluorine content of the solvent is greater than about 60 percent by weight.

It is known by those skilled in the art of colored electrophotography that both dyes and pigments have been used as the colorant in toners. One of the advantages of pigments is that migration, or "bleeding", is minimized at the fusion step. The primary advantages of dyes are their bright colors and transparency. Toners comprising polymeric dyes provide the advantages of being both highly transparent and non-migratory, which make them well-suited in applications requiring high quality images, such as, for example, in proofing or business graphics. Another advantage of using toners comprising polymeric dyes over toners containing pigments is that the former have the potential to be more conformable to the final image receiving layer. Conformability is particularly important when the receiving layer is plain paper, where abrasion resistance and adhesion are important considerations. A further advantage of toners comprising polymeric dyes over toners containing pigments is greater stability of the dispersion, because flocculation, caused by desorption of the colorant from the toner, is not likely in these systems. A process advantage of toners comprising polymeric dyes is that the milling operation required to incorporate a pigment in a dispersing medium is avoided.

Polymeric dyes can be classified in two classes: (1) backbone polymeric dyes and (2) pendant polymeric dyes. In backbone polymeric dyes, the dye moiety is a segment in the polymeric chain. In pendant polymeric dyes, the dye moiety is tethered to the polymeric chain either directly via the dye moiety or indirectly via a connecting group, e.g., an alkylene group. A typical backbone polymeric dye can be prepared by reacting a dye containing two reactive groups, such as two acid chloride groups, with a colorless organic diol or diamine. Many backbone polymeric dyes are based on polyesters or polyamides. There are two general methods for preparing pendant polymeric dyes: (1) the polymerization of a monomer containing a pendant dye moiety, and (2)

the reaction of a pre-formed polymer with a reactive dye or reactive dye developer.

It would be desirable to develop a polymeric dye suitable for a toner that is dispersible in a highly fluorinated solvent.

SUMMARY OF THE INVENTION

In one aspect, this invention provides novel polymeric dyes. The novel polymeric dyes can be introduced into highly fluorinated solvents to form stable colored dispersions. These dispersions can be used in toners for electrophotography. The polymeric dye comprises acrylic or methacrylic monomeric units having pendant chromphores. In one preferred embodiment, the polymeric dye is a copolymer derived from one or more highly fluorinated monomers capable of being polymerized by free radical polymerization, e.g., pentadecafluorooctylacrylate, and one or more monomeric chromophores capable of being polymerized by free radical polymerization, e.g., 1-(methacrylamido)anthraquinone.

In another aspect, this invention provides methods for preparing toners comprising polymeric dyes, wherein the polymeric dyes comprise (a) domains that render the dyes soluble or dispersible in highly fluorinated solvents and (b) domains that impart color. In one embodiment, toners can be formed by a method comprising the steps of:

(1) combining in a highly fluorinated solvent (a) at least one monomer capable of free radical polymerization, which at least one monomer (a) contains a chromophore that is covalently linked to the polymerizable monomer (a), (b) at least one monomer capable of free radical polymerization which at least one monomer (b) does not contain a chromophore, said at least one monomer (b) preferably having at least one group thereon that can sequester a metal cation, and at least one of (c) at least one highly fluorinated surfactant and (d) at least one macromer that is dispersible in the highly fluorinated solvent, to form a mixture;

(2) emulsifying the mixture of step (1) to form an emulsion in the highly fluorinated solvent; and (3) free radically polymerizing the polymerizable components of the emulsion formed in step (2) in the presence of a metal cation (e.g., a charging agent or charge directing agent).

If the macromer (d) is not used, the surfactant (c) must be used. Both the surfactant (c) and the macromer (d) can be used together. If the macromer (d) is used, the surfactant (c) need not be used.

In another embodiment, toners can be formed by a method comprising the steps of:

(1) combining in a highly fluorinated solvent (a) at least one monomer capable of free radical polymerization, which at least one monomer (a) contains a chromophore that is covalently linked to the polymerizable monomer (a), and (d) at least one macromer that is dispersible in the highly fluorinated solvent, to form a mixture;

(2) emulsifying the mixture of step (1) to form an emulsion in the highly fluorinated solvent; and (3) free radically polymerizing the polymerizable components of the emulsion formed in step (2) in the presence of a metal cation (e.g., a charging agent or charge directing agent).

A surfactant (c) can optionally be used. If the macromer (d) is used, the surfactant (c) need not be used.

In a third aspect, this invention provides positively charged latices that can be imagewise deposited onto a conducting material that has been coated with an image release layer. Such imagewise deposited latices can be transferred to plain paper via an intermediate surface, preferably comprising a fluorosilicone elastomer. The intermediate surface conforms to the surface of the paper, thereby allowing intimate contact and good adhesion between the latices and the paper. In one preferred embodiment, the latices have been electrostatically charged by complexation with $Zr^{4+}$ or other multivalent ion and have been dispersed in a highly fluorinated solvent.

The latices can be stabilized electrostatically or sterically or both. Electrostatic stabilization involves the incorporation of a charged species, such as $Zr^{4+}$, into the particle The charged particles repel particles having a like charge, thereby preventing agglomeration. Steric stabilization involves the use of a polymeric shell that is soluble in a highly fluorinated solvent, such that soluble polymeric chains extend into the solvent. These soluble chains provide for a volume exclusion, thereby preventing the approach of another particle and aggregation in dilute toner solutions.

In a fourth aspect, this invention provides a method of forming an image by using the toners of this invention. The method comprises the steps of:

(1) providing a dielectric medium having at least one region of electrostatic charge (e.g., an imagewise distribution of charge), (2) intimately associating the dielectric medium with a liquid toner (usually in the form of small droplets that can be imagewise attracted to the dielectric medium according to the distribution of charge) comprising a highly fluorinated solvent, preferably a perfluorinated solvent, and, suspended therein, charged particles of a polymeric dye, thereby depositing the toner on the dielectric medium, and (3) optionally transferring the deposited toner to a receptor.

This invention provides toners comprising polymeric dyes and methods for preparing toners comprising polymeric dyes. These toners exhibit excellent transferability from the surface of a photoconductor to the surface of a receptor. Liquid toners of the present invention can produce images that dry very quickly (e.g., drying time of less than 3 seconds) on a dielectric medium, so that successive imaging of three and four colors can be performed at a rate of up to three pages of four-color copy per minute on plain paper. State of the art toners produce images that do not dry at a rate fast enough to produce the hard copy output at the required rate, while simultaneously providing safe operation. The use of non-flammable highly fluorinated solvents having boiling points as low as 70° C. makes such fast drying possible. Hydrocarbon solvents having sufficiently low boiling points to bring about fast drying are both flammable and toxic.

The materials and processes of the present invention provide improved means for rapid generation of high quality electrophotographic and electrographic images.

Another important benefit of the present invention is the development of a simplified procedure for preparing a stabilizing macromer and subsequent reaction thereof to form a useful toner.

DETAILED DESCRIPTION OF THE INVENTION

As used herein, the prefix "perfluoro" and the term "perfluorinated" means that substantially all hydrogen atoms within the molecule or group defined as perfluorinated have been replaced with fluorine atoms, except where otherwise noted. The expression "highly fluorinated" means having a fluorine content greater than about 60% by weight. The expression "highly fluorinated solvent" means an organic solvent having a fluorine content greater than about 60% by weight. The expression "polymeric dye" means a compound comprising a polymeric moiety and a chromophore moiety. The expression "pendant polymeric dye" means a polymeric dye wherein the dye moieties are tethered to the backbone of the polymer either directly via the dye moiety (chromophore) or indirectly via a connecting group, e.g., an alkylene group. The term "toner" means a dispersion comprising polymeric dye dispersed in a dispersing medium. The term "latex" means a stable colloidal dispersion of a polymeric dye in a nonaqueous medium. The term "macromer" means a polymer having a medium molecular weight and a low degree of polymerization, e.g., from about 5 to about 5000, and typically having a reactive group at one or both ends thereof. Preferably, macromers useful in this invention have a degree of polymerization of from about 50 to about 1250.

A general formula representing the polymeric dye of this invention can be expressed as follows:

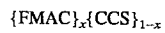

where FMAC represents macromeric segment(s) that render the polymeric dye dispersible in a highly fluorinated solvent, CCS represents chromophore-containing segment(s), and x represents the weight fraction of the macromeric segment(s) in the polymeric dye. The value of x can range from zero to about 0.9, and preferably ranges from about 0.15 to about 0.30. When x=0, CCS must contain a sufficient number of fluorine atoms so that the polymeric dye can be dispersed in a highly fluorinated solvent.

Typical macromers suitable for preparing the macromeric segment(s) are highly fluorinated macromers, such as, for example, any highly fluorinated macromer having a molecular weight in the range of from about 5,000 grams/mole to about 500,000 grams/mole, preferably from about 5,000 grams/mole to about 125,000 grams/mole, and a fluorine content of from about 40 to about 75 percent by weight.

The macromeric segment(s) can be derived from a macromer that can be formed in a process comprising the steps of:

(1) heating a mixture containing (i) at least 97% by weight of at least one highly fluorinated, preferably perfluorinated, hydrocarbon monomer and (ii) up to 3% of a substantially non-fluorinated free radically polymerizable monomer in the presence of (iii) a chain transfer agent and (iv) a free radical generating initiator, at least one of said substantially non-fluorinated monomer, chain transfer agent, or initiator having a pendant hydroxy (—OH) group, and (2) reacting at least some of the pendant hydroxy groups provided by either the chain transfer reagent, the initiator, or substantially non-fluorinated monomer, with a coupling agent containing a free radically polymerizable group.

The foregoing reaction can be carried out in a highly fluorinated solvent; however, it is preferred that a co-solvent be present when the reactants for preparing the chromophore-containing segment exhibit poor solubility in the highly fluorinated solvent. The co-solvent is miscible with the highly fluorinated solvent, has a lower flash point than the highly fluorinated solvent, and is a better solvent for the polymerizable dye than is the highly fluorinated solvent. Many solvents (e.g., "FREON" solvents) are acceptable co-solvents, and a preferred solvent has the trademark "GENESOLVE 2000".

Non-limiting examples of highly fluorinated hydrocarbon monomer (i) include: fluorinated alkenes such as pentafluorostyrene, octafluorostryene, perfluoro-1,4-pentadiene, perfluoro-1,6-heptadiene, 3,5-bis(trifluoromethyl) styrenes, etc.; fluorinated acrylates and methacrylates such as 2,2,3,3,4,4,5,5,6,6,7,7,8,8,8-pentadecafluorooctyl acrylate, 2,2,3,3,4,4,5,5,6,6,7,7,8,8,8-pentadecafluorooctyl methacrylate, 2,2,3,3,4,4,5,5,6,6,7,7,8,8,9,9,10,10,10-nonadecafluorodecyl methacrylate, 1,2,2,3,3,4,4,5,5,6,6-undecafluorocyclohexylmethyl acrylate, 1,2,2,3,3,4,4,5,5,6,6-undecafluorocyclohexylmethyl acrylate, 1,2,2,3,3,4,4,5,5,6,6-decafluoro-4-trifluoromethylcyclohexylmethyl acrylate, perfluorohexyl acrylate, perfluorobutyl acrylate, perfluorodecyl acrylate, 2,2,2-trifluoroethyl acrylate, 2,2,2-trifluoroethyl methacrylate, 1,1,1,3,3,3,-hexafluoro-2-propyl acrylate, $C_8F_{17}SO_2N(n-C_4H_9)CH_2CH_2O_2CCH=CH_2$, etc; trifluorinated alkyl acrylonitriles, e.g., trifluoromethyl acrylonitrile; perfluoroalkyl vinyl ethers such as perfluorobutyl vinyl ether, pentafluoroethyl vinyl ether, etc.; or any other highly fluorinated monomers.

The substantially non-fluorinated monomer (ii) can be a charge-directing metal-chelating monomer, e.g., 4-vinyl pyridine.

Substantially non-fluorinated free radically polymerizable monomers suitable for preparing the macromers include, but are not limited to, ethylenically unsaturated monomers, such as, for example, vinyl ethers such as butyl vinyl ether, ethyl vinyl ether, phenyl vinyl ether, etc.; vinyl esters, such as vinyl acetate, vinyl propionate, vinyl butyrate, etc.; chlorinated vinyl alkenes, such as vinylidene chloride and vinyl chloride; styrenes, such as 4-methylstyrene, styrene, α-methylstyrene, etc.; acrylate and methacrylate esters, such as isobornyl acrylate, isobornyl methacrylate, decyl acrylate, butyl methacrylate, lauryl methacrylate, etc.; acrylonitrile; vinylazlactones; vinylpryidines; N-vinylpyrrolidones; acrylic and methacrylic acids, silanes, such as tris(trimethylsiloxy)-3-methacryloxypropylsilane, trimethylsilyl methacrylate and the like. These monomers are commercially available from standard vendors or may be prepared according to methods readily described in available literature. In addition, monomers that form copolymers such as maleic anhydride may be employed.

Suitable substantially non-fluorinated free radically polymerizable monomers having a group for binding a polyvalent metal ion, i.e., charge-directing bidentate chelate monomers, are well known in the electrophotographic art and include, for example, those monomers having acetoacetoxy groups, such as acetoacetoxyethyl methacrylate (acetoacetoxy groups, though well-known as complexing agents, may not be common and well-known in toner technology), 8-hydroxyquinoline groups such as 8-hydroxyquinolin-5-ylmethyl acrylate, bipyridyl groups such as 2,2'-bipyrid-4-ylmethyl acrylate, and so on. They may be obtained commercially or prepared by standard methods.

Examples of chain transfer agents suitable for providing a polymer with a hydroxy group are mercaptoalcohols, such as, for example, 3-mercapto-1,2-propanediol, 2-mercaptoethanol, 3-mercapto-2-butanol, 1-mercapto-2-propanol, 2-mercapto-3-pyridinol, mercaptophenol, and bromoalcohols, such as bromoethanol. A class of chain transfer agents suitable for providing a polymer with a free carboxylic acid group are mercaptocarboxylic acids, such as, mercaptoacetic acid and halogenated aliphatic carboxylic acids.

Examples of coupling agents containing a free radically polymerizable group for converting the hydroxy-containing polymer into a macromer include acryloyl halides such as acryloyl chloride, methacryloyl halides such as methacryloyl chloride, isocyanatoalkyl methacrylates such as isocyanatoethyl methacrylate, and glycidyl methacrylates. Examples of coupling agents containing a free radically polymerizable group for converting a carboxy-containing polymer into a macromer are glycidyl methacrylates.

Free radical initiators suitable for initiation of polymerization include 2,2'-azobis(2-methylpropionitrile); 4,4'-azobis(4-cyanopentoic acid,) 2,2'-azobis{2-methyl-N-[1,1-bis(hydroxyethyl)propionamide}; 2,2'-azobis{2-methyl-N-[1,1-bis(hydroxymethylethyl)]propionamide}; 2,2'-azobis{2-methyl-N-(2-hydroxyethyl)propionamide}. Preferred initiators contain a free hydroxy group.

Charge directors suitable for this invention include polyvalent metal ions. The charge director can be introduced in the form of a metal salt. Preferred metal salts are composed of metal ions with organic anions as the counterion. Preferred metal ions are Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), and Ti(IV). A preferred metal ion is zirconium (IV). Preferred organic anions are carboxylates derived from aliphatic or aromatic carboxylic acids or sulfonates derived from aliphatic or aromatic sulfonic acids, preferably aliphatic fatty acids such as stearic acid, behenic acid, neodecanoic acid, diisopropylsalicylic acid, octanoic acid, abietic acid, naphthenic acid, octanoic acid, lauric acid, tallic acid, etc. Another useful source of barium ion for the practice of this invention has the trade designation "BARIUM PETRONATE" (Witco Chemical Corporation, Sonneborn Division, N.Y.). The metal salts can be introduced either after the polymeric dye is formed or prior to the grafting of the CCS onto the fluorinated macromer.

To prepare the macromers, highly fluorinated monomers may be prepared and polymerized by known methods such as those described by Ito et al. in *Macromolecules* 1982, 15, 915–20 and *Macromolecules* 1984, 17, 2204–5. Suitable methods of polymerization include bulk, emulsion, or dispersion free radical polymerization, bulk anionic polymerization. Many fluorinated monomers suitable for preparing macromers useful in practice of the present invention are commercially available from Minnesota Mining and Manufacturing Company (St. Paul, Minn.) or E.I. DuPont de Nemours (Wilmington, Del.).

The CCS comprises moieties derived from (a) at least one free radically polymerizable monomer containing a chromophore that is covalently linked to the polymerizable monomer and (b) optionally, at least one essentially colorless free radically polymerizable monomer. In addition, the CCS may optionally comprise fluorinated monomeric units. When a fluorinated macromer is not present, i.e. when x=0, the CCS must comprise a sufficient number of fluorine atoms to render the CCS dispersible in a highly fluorinated solvent.

Preferred free radically polymerizable monomers that can contain a covalently-linked chromophore include monomers having acrylate, methacrylate, or vinyl groups. Preferred chromophores are azo, metalazo, metal-azomethine, hydrazone, and anthraquinone. The units of the polymer derived from the monomer containing the chromophore will preferably make up from about 0.1% to about 10% by weight of the polymeric dye. More preferably, the the units of the polymer derived from the monomer containing the chromophore will make up from about 1% to about 10% by weight of the polymeric dye. Preferred CCS groups comprise copolymers derived from polymerization of essentially colorless monomer, such as methyl methacrylate or ethyl methacrylate, with monomers containing chromophores, such as monomeric dyes having pendant acrylate or methacrylate groups. The colorless monomers are preferably selected from the following classes of monomers:

(1) highly fluorinated hydrocarbon monomers that can be used to prepare the macromers, as described previously;

(2) charge directing metal-chelating monomers that can be used to prepare the macromers, as described previously;

(3) substantially non-fluorinated free radically polymerizable monomers that can be used to prepare the macromers, as described previously.

These colorless monomers that make up the copolymer preferably comprise from about 90% to about 99.9% by weight of the CCS. In another preferred CCS, the polymeric dye comprises from about 1% to about 10% of a metal chelating monomeric units.

Many suitable free radically polymerizable monomers containing chromophores are known in the art. A preferred class of such monomers can be prepared by the reaction of acryloylchloride or alkacryloylchloride as shown in the following equation:

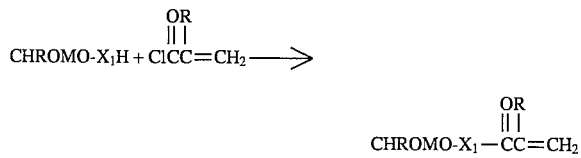

wherein CHROMO represents a dye (chromophore) moiety that can be derived from anthraquinone, azo, metal-azo, azomethine, metal-azomethine, hydrazone, aminostyryl, phthalocyanine, and indoaniline dyes; $X_1$ represents either an oxygen atom or a N-R moiety, wherein R represents hydrogen, alkyl group having from 1 to 18 carbon atoms, or aryl group having from 6 to 18 carbon atoms in the ring portion thereof. Representative examples of CHROMO-$X_1$H include 1-aminoanthroquinone, 1-(3-hydroxypropylamino) anthraquinone, Disperse Red 1. Representative examples of dyes containing acryloyl and methacryloyl group are described in U.S. Pat. No. 4,614,521 section [D], "sublimable dyes having an acryloyl or a methacryloyl group". That description is incorporated herein by reference. Another list of dyes containing acryloyl and methacryloyl group are described in U.S. Pat. No. 4,795,794, incorporated herein by reference.

Another class of polymerizable monomers containing chromophores that are useful in this invention are metal-azo or metal-azomethine dyes, such as those described in U.S. Pat. No. 5,166,326, incorporated herein by reference.

Yet another class of polymerizable monomers containing chromophores are those containing a styryl moiety. These monomers may be prepared, for example, by the nucleophilic aromatic substitution of a halogen-containing precursor by 4-aminostyrene. Particularly useful halogen-containing precursors from the anthaquinone class include, for example, 1-chloranthraquinone, 1-amino-2-methyl-4bromoanthraquinone. Other examples of polymerizable monomeric anthraquinones are described in R.S. Asquith, H.S. Blair, A.A. Crangle, E. Riordan "Self-colored Polymers Based on Anthraquinones" Journal of the Society of Dyers and Colourists; Apr. 1977; pp. 114–125.

The essentially colorless monomer that can be incorporated into the CCS segment can serve a variety of functions.

One important function is coordination of a charge director. The purpose of a charge director is to provide a charge to the polymeric dye. Useful monomers for this function include: 4-vinylpyridine, 1-vinyl imidazole, 4-vinyl bipyridine, 4-vinyl-4'-methyl bipyridine, 3-vinylbenzylacetylacetone, 3-allylacetylacetone, acetoacetoxyalkyl acrylates, such as acetoacetoxyethyl acrylate, acetoacetoxyalkyl methacrylates, such as acetoacetoxyethyl methacrylate, alternatively named 2-(methacryloyloxy)ethyl acetoacetate, 5-methacryloxymethyl-8-hydroxyquinoline, N-vinylbenzyliminodiacetic acid, 18-vinyl-5,6-benzo-4,7,13,16,21,24-hexaoxa-1,10-diazabicyclo[8.8.8]hexa-cos-2-ene. The monomer can chelate with a metal soap to provide a charge to the toner. The monomer can be monodentate, but is preferably bidentate, and is capable of forming either a 5- or 6-member ring system incorporating a metal center. Other charge directing chelating compounds and processes for incorporating them into toners are disclosed in U.S. Pat. No. 4,56.4,574, incorporated herein by reference. The colorless monomer can be incorporated either in the macromeric segment or the chromophore segment, but it is preferred that the colorless monomer be incorporated in the chromophore segment.

Other essentially colorless monomers incorporated in the CCS can be used to modify physical properties such as particle size, film forming ability, and $T_g$. Examples of these monomers include styrene, p-chlorostyrene, methylstryenes, vinyl ethers or halogenated vinyl ethers, and halogenated vinyl esters inclusive of vinyl acetate, alkyl acrylates and alkyl methacrylates, such as methyl methacrylate, ethyl ethacrylate, ethyl acrylate, n-butyl acrylate, isobutyl acrylate, phenyl acrylate, methyl acrylate, n-butyl methacrylate, hydroxyethyl methacrylate, hydroxypropyl methacrylate, glycidyl methacrylates, vinyl azlactones, vinyl oxazolines, and the like.

Solvents that may be used for liquid toners of the present invention should have a boiling point greater than about 70° C. and less than about 140° C., preferably from about 90° C. to about 100° C. Representative classes of these solvents include highly fluorinated, preferably perfluorinated, species of alkanes, ethers, arenes, alkarenes, aralkanes, alkenes, and alkynes. The solvents may contain rings. Non-limiting examples of perfluoroalkanes include perfluoroheptane, perfluorinated 2-butyltetrahydrofuran, and mixtures of the foregoing with perfluorooctane, perfluorohexane, perfluorotributylamine, perfluorotriamylamine, "FLUORINERT" solvents available from Minnesota Mining and Manufacturing Company, such as "FLUORINERT" solvents having the trade designations FC-84, FC-77, FC-104, FC-75, FC-40, FC-43, FC-70, FC-71, etc. Because many perfluorinated materials have residual amounts of hydrogen atoms that were not replaced by fluorine, it is anticipated that hydrogen atoms in the solvent are not deleterious, provided that the total fluorine content is greater than about 60% by weight. On the other hand, chlorine and bromine are highly undesirable in the solvent for pollution, corrosion, and other reasons.

There are three general methods for preparing the toners of this invention. In one general method, the macromer is not used. In the other two general methods the macromer is used.

In the general method where the macromer is not used, monomer (a), i.e., the free radically polymerizable monomer that contains a covalently-linked chromophore, monomer (b), i.e., the free radically polymerizable monomer that does not contain a chromophore, and a surfactant are added to a highly fluorinated solvent in any order to form a mixture. As mentioned earlier, because the fluorinated macromer is not present, monomer (a), monomer (b), or both, must provide a sufficient number of fluorinated carbon atoms to render the polymeric dye dispersible in the highly fluorinated solvent. Typically, monomer (b) will provide the requisite fluorinated carbon atoms. It should be noted that more than one class of monomer (b) can be used. If monomer (a) or monomer (b) is not soluble in the highly fluorinated solvent, it is preferred that a substantially non-fluorinated hydrocarbon co-solvent be used along with the highly fluorinated solvent. Then, the metal cation is added to the foregoing mixture. The mixture is then emulsified, preferably by means of stirring. After the emulsion is formed, an initiator is added to the emulsion to initiate polymerization of the polymerizable components. Upon completion of the polymerization reaction, the dispersion containing the reaction product and the solvent can be used as a toner.

In one general method where the macromer is used, the macromer is prepared in the highly fluorinated solvent. As with the previous method, a substantially non-fluorinated hydrocarbon co-solvent can be added to the highly fluorinated solvent if any of the monomers is not soluble in the highly fluorinated solvent. The macromer is preferably prepared by solution polymerization of monomers such as perfluorooctylacrylate in the presence of a chain transfer agent, and treating the polymer solution with reagents such as isocyanatoethyl methacrylate, which reacts with the —OH terminal group to provide a polymerizable moiety.

Then monomer (a), monomer (b), and the metal cation, and surfactant, if desired, and any other monomer, if desired, can be added to the dispersion containing the macromer and the solvent. The resulting mixture is then emulsified, preferably by means of stirring. After the emulsion is formed, an initiator is added to initiate polymerization of the polymerizable components. Upon completion of the polymerization reaction, the dispersion containing the reaction product and the solvent can be used as a toner.

In the other general method where the macromer is used, the macromer is prepared in the highly fluorinated solvent. As with the previous method, a substantially non-fluorinated hydrocarbon co-solvent can be added to the highly fluorinated solvent if any of the monomers is not soluble in the highly fluorinated solvent. The macromer is preferably prepared by solution polymerization of monomers such as perfluorooctylacrylate in the presence of a chain transfer agent, and treating the polymer solution with reagents such as isocyanatoethyl methacrylate, which reacts with the —OH terminal group to provide a polymerizable moiety.

Then monomer (a) and the metal cation, and surfactant, if desired, and any other monomer, if desired, can be added to the dispersion containing the macromer and the solvent. The resulting mixture is then emulsified, preferably by means of stirring. After the emulsion is formed, an initiator is added to initiate polymerization of the polymerizable components. Upon completion of the polymerization reaction, the dispersion containing the reaction product and the solvent can be used as a toner. In this general method, monomer (b) is not required.

Electrophotographic and electrographic processes involve forming an electrostatic image on the surface of a dielectric medium. The dielectric medium may be an intermediate transfer drum or belt or the substrate for the final toned image itself, as described by Schmidt, S. P. and Larson, J. R. in *Handbook of Imaging Materials,* Diamond, A. S., Ed: Marcel Dekker: New York; Chapter 6, pp. 227–252, and U.S. Pat. Nos. 4,728,983, 4,321,404, and 4,268,598.

In electrophotography, the image is typically formed on a drum coated with a dielectric medium by (1) uniformly charging the dielectric medium with an applied voltage, (2) discharging the electrostatic image in selected areas by exposing those regions to be discharged to light, (3) applying a toner to the electrostatic medium having the charge image, and (4) transferring the toned image through one or more steps to a receptor sheet where the toned image is fixed.

In electrography, the image is typically formed by (1) placing onto a dielectric medium (typically the receiving substrate) a charge in selected areas of the medium with an electrostatic writing stylus or its equivalent to form a charge image, (2) applying toner to the charge image, and (3) fixing the toned image.

While the electrostatic charge of either the toner particles or dielectric medium may be either positive or negative, electrophotography as employed in the present invention normally is carried out by dissipating charge on a positively charged dielectric medium. Toner is then deposited in the regions where positive charge was dissipated.

Because the two processes are similar, toners useful in electrophotography are generally useful in electrography as well. Although both dry and liquid toners may be used to supply the colorant necessary to form the colored image, liquid toners typically provide better resolution in electrophotographic and electrographic imaging applications than do dry toners, but have problems related to difficulties in handling solvents.

Liquid toners are stabilized against flocculation by electrostatic charges that may be either positive or negative (i.e., electrostatic stabilization), and are optionally also stabilized by long chain solvated polymer segments (i.e., steric stabilization). These long chain solvated segments prevent portions of the polymeric resin core of the particles from agglomerating by providing a soluble shell surrounding the insoluble portions of the resin.

Images formed by the present invention may be of a single color or of a plurality of colors. Multicolor images can be prepared by repetition of the charging and toner application steps. Full color reproductions may be made according to the present invention by electrophotographic methods such as those described by U.S. Pat. Nos. 2,297,691; 2,752,833; 4,403,848; 4,467,334; 2,986,466; 3,690,756; and 4,370,047, all of which are incorporated herein by reference.

Substrates for receiving the image from the photoconductor preferably should be conformable to the microscopic undulations of the imaging surface. Materials such as plasticized and compounded polyvinyl chloride (PVC) conform to the imaging surface well, whereas materials such as polycarbonate do not. Consequently, polycarbonates give bad transfer of the toner image. Other materials that may be used to form substrates include acrylics, polyurethanes, polyvinyl butyrals, and polyethylene/acrylic acid copolymers. Commercially available composite materials such as those having the trade designations "SCOTCHCAL" and "PANAFLEX" are also suitable for preparing substrates. However, some materials such as polyesters and polycarbonates, which appear to be too stiff to give microconformability, can be useful for preparing receptors in the present invention by coating them with a sufficiently thick layer of materials with a suitable $T_g$ and a complex dynamic viscosity below about $2.5 \times 10^5$ poise at a temperature in the range of from about 50° C. to about 150° C. On substrates made of materials such as PVC, the coated layer thickness can be as low as 3 micrometers, whereas on substrates made of "SCOTCHLITE" retroreflective material, a coated layer thickness of 30 micrometers may be required.

Other materials suitable for use as substrates may be chosen from a wide variety of materials including papers, siliconized papers, plastics, etc. If a separate electroconductive layer is required, it may be made of thin metal, such as aluminum, tin oxide, or other materials that are stable at room temperatures and at the elevated temperatures of the transfer process.

The transfer of the deposited image from the charged surface to the receiving substrate is enhanced by the incorporation of a release material within the dispersed toner particles used to form the image. The incorporation of a release material comprising silicone in the outer layer (shell) of the particle facilitates the efficient transfer of the image. Monomers comprising silicone can also be placed into the core of the particle, and subsequent migration thereof to the surface of the particle will provide enhanced release.

Toners are usually prepared in a concentrated form to conserve storage space and reduce transportation costs. In order to use the toners in the printer, the concentrate is diluted with additional carrier liquid to give what is termed the working strength liquid toner.

In multicolor imaging, the toners may be applied to the surface of the image sheet in any order, but for colormetric reasons, bearing in mind the inversion that occurs on transfer, it is preferred to apply the images down in the following order: black, cyan, magenta, and yellow.

In order to function effectively, liquid toners should have conductance values in the range of 2 to 100 picomho-cm$^{-1}$. Liquid toners prepared according to the present invention have conductance values of from 3 to 85 picomho-cm$^{-1}$ for a 2 weight percent solids dispersion.

Overcoating of the transferred image may optionally be carried out to protect the image against physical damage and/or actinic damage. Compositions for overcoatings are well known in the art and typically comprise a clear film-forming polymer dissolved or suspended in a volatile solvent. An ultraviolet light absorbing agent may optionally be added to the coating composition. Lamination of protective layers to the image-bearing surface is also well known in the art and may be used in this invention.

These and other aspects of the present invention are demonstrated in the illustrative examples that follow. The following acronyms will be used in the illustrative examples:

EA: ethyl acrylate; EMA: ethyl methacrylate: BMA: butyl methacrylate; FOA: pentadecafluorooctyl acrylate; AAMA: acetoacetoxyethyl methacrylate; VT: 3,4 Methyl styrene; TMPS: tris(trimethylsiloxy)-3-methacryloxypropylsilane. PcHA: undecafluorocyclohexylmethyl acrylate; TFA: 2,2,2-trifluoroethyl acrylate;

EXAMPLES

Materials used in the following examples were available from standard commercial sources such as Aldrich Chemical Co. (Milwaukee, Wis.), unless otherwise specified.

The term "perfluorooctyl acrylate" as used herein refers to $H_2C=CHCO_2CH_2(CF_2)_6CF_3$.

All the liquid toners described in the examples produced films of sufficient integrity to allow image formation and subsequent transfer steps.

Particle sizes were measured by a Coulter Model N4 MD submicron particle size analyzer.

All parts and percentages are by weight unless indicated otherwise.

Preparation of 1-(methacrylamido)anthraquinone (MAQ)

1-(Methacrylamido)anthraquinone was prepared by a procedure described in British Patent Specification 1,036,700, incorporated herein by reference, with a slight modification. The modification involved heating the 1-aminoanthraquinone o-dichlorobenzene solution to ca. 140°–150° C., prior to addition of the sodium carbonate.

Preparation of 1-[4-[2-hydroxyethyl]phenyl]aminoanthraquinone (HEPAAQ)

HEPAAQ was prepared by a procedure described in Lord, M. W.; Peters, A. T.; J. *Chem. Soc., Perkins Trans.*, 1,(20)2305–8, incorporated herein by reference, with a slight modification. In a 250 mL single-necked round-bottom flask equipped with a reflux condenser was placed 1-chloroanthraquinone (10.5 g), 4-aminophenethyl alcohol (11.2 g), potassium acetate (7.87 g), copper acetate (0.46 g), and nitrobenzene (75 mL). The flask was flushed with nitrogen and then heated to reflux for about 2 hours. The mixture was filtered. The solvent was removed from the filtrate, and the resultant solid was washed with methanol. The product was purified by dissolving the dried filtrate in dichloromethane and chromatographing on a silica column using a 10/90 (v/v) acetone/dichloromethane mixture as the eluent. The solvent was removed from the chromatographed material and dried in vacuo.

Preparation of 1-[4-(2-methacryloxyethyl)phenyl]aminoanthraquinone (REDAO)

A 500 mL round-bottom flask was charged with HEPAAQ (8.5 g), dimethylaminopyridine (0.89 g), triethylamine (3.44 mL), and anhydrous dichloromethane (200 mL). The mixture was cooled in an ice bath and methacryloyl chloride (2.36 g) was added. The reaction was conducted under nitrogen overnight. The resulting solution was run down a silica gel column using dichloromethane as the eluent. The product had the higher Rf value. The chromatographed material was recrystallized from a dichloromethane/methanol mixture.

Preparation of the Methacryl Ester of Disperse Red 1 (ORANGEAZO)

The methacryl ester of Disperse Red 1 has been previously reported in Matsumoto, S.; Kubodera, K.; Kaino, T. *Appl. Phys. Lett.* 51,1,(1987), incorporated herein by reference. Into a 250 mL single-necked flask were placed Disperse Red 1 (9.43 g, Aldrich) and dimethylaminopyridine (0.10 g). The flask was sealed with a rubber septum, and the flask purged with nitrogen. Anhydrous dichloromethane (approximately 150 mL) was added to the flask via canula tube, and then triethylamine (4.2 mL) was added by syringe. The flask was cooled by placing it in an ice bath. Then methacryloyl chloride (2.8 mL) was added dropwise via a syringe. The reaction was allowed to proceed overnight. The product was isolated by chromatography on silica gel using a 30/70 (v/v) hexane/dichloromethane mixture. The chromatographed product was recrystallized from a dichloromethane/methanol mixture.

Preparation of 1-(1-ethylpropylamino)anthraquinone (EPAQ)

A Parr stainless steel high pressure reactor was charged with 1-chloroanthraquinone (24.3 g), 1-ethylpropylamine (17.5 g), potassium acetate (14.0 g), activated copper metal (0.7 g), and water (0.05 g). The reaction vessel was sealed and heated to a temperature of 180° C. in an oil bath for 12 hours. The oil bath was removed and the vessel was allowed to return to ambient conditions. The solid was extracted with methylene chloride and the insoluble materials removed by filtration. The solvent was removed and the solid recrystallized from hot methanol. The material was chromatographed on a silica gel column using toluene as the eluent.

Preparation of 1-(1-ethylpropylamino)-4-bromanthraquinone (BEPAQ)

EPAQ (20.02 g) was dissolved in hot acetic acid. In a separate flask, bromine (12.03 g) was dissolved in acetic acid (ca. 10 mL). The bromine solution was slowly added to the dye solution. The reaction was allowed to proceed for ½ hour, with occasional shaking. The reaction mixture was poured into water (600 mL), and aqueous sodium sulfite was added to discharge the bromine. The aqueous solution was decanted off. The solid was dissolved in methylene chloride and then concentrated and slowly added to cold methanol whereupon a solid precipitated.

Preparation of 1-[1-ethylpropylamino]-4-[4-[2-hydroxyethyl)phenyl]aminoanthraquinone (HEPEPAQ)

A 500 mL round-bottom flask equipped with a reflux condenser and a stir bar was charged with EMPAQ (16.0 g), 4-aminophenethylalcohol (11.79 g), potassium acetate (8.0 g), copper acetate (0.0.57 g), and nitrobenzene (100 mL). The mixture was heated with stirring under a blanket of nitrogen for about 3 hours. At this point, thin layered chromatography showed that a blue material had been formed; however, some starting material was still present. Addition of more copper acetate, and potassium acetate, along with continued heating, resulted in little apparent change. The nitrobenzene was removed by vacuum distillation. The desired product was isolated by redissolving the solid in dichloromethane and purifying using a short column of silica gel.

Preparation of 1-[1-ethylpropylamino]-4-[4-(2-methacryloxyethyl)phenyl]aminoanthraquinone (CYANAQ)

A 500 mL single-necked flask was charged with HEPEPAQ (5.2 g) and dimethylaminopyridine (0.04 g). The flask was sealed with a rubber septum and purged with nitrogen. Anhydrous dichloromethane (approximately 75 mL) was added to the mixture via canula tube. The flask was cooled in an ice bath, and triethylamine (1.22 g) was added to the mixture. This addition was followed by dropwise addition of methacryloyl chloride (1.26 g). After 2½ hours, some HEPEPAQ was still present. Additional methacryloyl chloride (0.12 mL) was added, and the mixture was stirred overnight. An additional amount of dimethylaminopyridine (0.018 g) and an additional amount of methacryloyl chloride (0.58 g) were added to the mixture. Stirring was continued for approximately 4 hours. The product was purified by chromatography on silica gel using dichloromethane as the eluent and then recrystallized from a dichloromethane/methanol mixture.

Preparation of Methyacryloxy—terminated Poly(pentadecafluorooctyl) Acrylate Macromer for Stabilizing the Dispersion of the Polymeric Dye in "FLUORINERT FC-75" Solvent (FMAC-1)

Pentadecafluorooctyl acrylate monomer (90.82 g) was mixed with a solvent comprising a mixture of perfluorinated octanes (FC-75, available from Minnesota Mining and Manufacturing, St Paul, Minn.) (47 g) and the resulting mixture was introduced in a 250 mL flask fitted with a nitrogen inlet, a reflux condenser, and a thermometer. Chain transfer agent 3-mercapto-1,2,propanediol (0.0864 g) and free radical initiator azobisisobutyronitrile (0.0656 g) were added, and the polymerization reaction was allowed to proceed for 24 hours at a temperature of 70° C. Additional FC-75 solvent (44 g) was then added to obtain a theoretical solid content of ~50%. After the syrup was cooled under dry conditions, isocyanatoethyl methacrylate (0.248 g) and dibutyltin dilaurate catalyst (0.05 g) were added with vigorous agitation. The mixture was stirred in the dark for 36 hours before use.

The molecular weight, Mn, as found by NMR, was 124,000 Daltons. The molecular weight (MW) distribution [polydispersity=(weight average MW)/(number average MW)] was found to be 4 by Gel Permeation Chromatography in "FREON-113" solvent using very low, narrow molecular weight perfluorinated polyethers as calibration standards.

Use of a ten-fold excess of chain transfer agent resulted in a sample of lower molecular weight (less than 15,000 Daltons), which provided poor dispersions. It was concluded that the most preferable molecular weight should be in excess of 100,000 Daltons to obtain stable dispersions. With correct choice of stabilizer, it should be possible to obtain dispersions with molecular weights in excess of 50,000 Daltons.

Dispersion Polymerization of Monomeric Acrylates and Macromer with the Dye in "FLUORINERT FC-75" Solvent The latices prepared in Examples I–V contain a core comprising hydrocarbon polymer and a shell comprising highly fluorinated polyacrylate.

EXAMPLE 1

FC-15—Yellow Polymeric Dye Toner

MAQ (2.2 g) was dissolved in a mixture containing the monomers ethyl acrylate (8 g), ethyl methacrylate (8 g), butyl methacrylate (7 g), and acetoacetoxyethyl methacrylate (2 g). This mixture was then thoroughly mixed with a solution of FMAC-1 (10 g of 50% solution) in "FLUORINERT FC-75" solvent (400 mL). A charge director ("ZIRCONIUM HEX-CEM", 15 g, 12% $Zr^{4+}$ content; Mooney Chemical, Cleveland, Ohio), was then added to the mixture. The surfactants "FC-430", "FC-129" and "FC-740" in quantities of 1 g, 0.5 g, and 0.5 g, respectively, were added to emulsify the monomers. Addition of the three surfactants provided a more stable emulsion than would be obtainable with any lower number of surfactants. Emulsification was carried out under continuous stirring by a magnetic spin bar. The reaction mixture was contained in a 3-necked 1 L flask fitted with a water-cooled reflux condenser, a nitrogen inlet tube, and a thermometer. After emulsification of the monomers and after the temperature remained constant at 70° C., the initiator t-butylperoctoate ("TRIGONOX" 21C-50) (1 g) was added to initiate polymerization, which was continued for 24 hours. A magenta colored stable latex was obtained, after the coagulum was skimmed away (less than 2 g). The solid content of the latex ranged from 3 to 4%.

The latex had a conductance of 120 picomho/cm. It was electroplated at 500 volts onto a photoconductor strip coated with a silicone release layer. The voltage applied to effect the electroplating was 500 V. The electroplated film on the photoconductor strip was treated as the image. Transfer of the image was effected by juxtaposing the image on the photoconductor strip against a plain paper receptor sheet and passing the two juxtaposed sheets through a nip roll laminator set at a temperature of 149° C. (300° F.). The actual temperature on the roll was estimated to be 70°–80° C. The pressure of lamination was set at 64 psi. A "SCOTCHCAL" strip was used as a backing. The optical density of the image was 0.14. The foregoing method of image formation and transfer was in EXAMPLES II–IV. Table 1 shows the particle size distribution for this latex and those of the remaining examples and is representative of the highly fluorinated dispersions of this invention.

EXAMPLE II

FC-15—Cyan Polymeric Dye Toner

A procedure substantially identical to that for preparing FC-15—Yellow Polymeric Dye Toner was used, with the exception that 1 g of CYANAQ was substituted for MAQ. Also, only "FC-430" surfactant was used; "FC-129" and "FC-740" surfactants were not used.

EXAMPLE III

FC-15—Orange Polymeric Dye Toner

A procedure substantially identical to that for preparing FC-15—Yellow Polymeric Dye Toner was used, with the exception that ORANGEAZO (2 g) was substituted for MAQ. Also, in this preparation, the only surfactant used was "FC-430" (1 g).

The conductance was 152 picomho/cm. The optical density of the image after transfer to paper was 1.08.

EXAMPLE IV

FC-19—Yellow Polymeric Dye Toner

A procedure substantially identical to that for preparing FC-15—Yellow Polymeric Dye Toner was used. However, the following monomers were used: ethyl acrylate (15 g), 3,4 methyl styrene (8 g), acetoacetoxyethyl methacrylate (2 g) and MAQ (3 g). "FC-430" surfactant (1 g) was used as the sole surfactant. FMAC-1 (15 g of a 50% solution) was used. The latex had a conductance of 215 picomho/cm and the electroplated and transferred image gave an optical density of 0.13.

EXAMPLE V

FC-25—Red Polymeric Dye Toner

The mixture for preparing this toner contained: EA (8 g), EMA (5 g), BMA (7 g), TMPS (3 g), TMPS (2 g), and REDAQ (1.5 g). This mixture was placed in a mixture of "FLUORINERT FC-75" solvent (200 mL) and "GENESOLVE 2000" solvent (200 mL) with a charge director ("ZIRCONIUM HEX-CEM" 1.5 g, 12% $Zr^{4+}$ content; Mooney Chemical, Cleveland, Ohio), and the surfactant "FC-430" (1 g). "GENESOLVE 2000" solvent had the chemical formula $CH_3CCl_2F$, and was obtained from Allied Signal Corp. FMAC-1 (10 g of a 50% solution) was added to the resulting mixture.

Polymerization was initiated by adding initiators 2,2'-azobis(2,4-dimethyl valeronitrile ("Vazo 52") (0.5 g) and t-butyl peroctoate ("TRIGONOX 21-C") (0.5 g) to the foregoing mixture and heating the mixture to a temperature of 45° C. The "GENESOLVE 2000" solvent rendered the dye more soluble, and the dye was maintained in the dissolved state during the initial phase of polymerization. Additional "FLUORINERT FC-75" solvent (200 mL) was added during the reaction. After polymerization had proceeded for a total of 4 hours, the temperature was gradually raised to 70° C. to distill off the low boiling "GENESOLVE 2000" solvent, leaving "FLUORINERT FC-75" as the only dispersion fluid. A solid content of ~4% was obtained.

Dispersion Polymerization of Highly Fluorinated Acrylates and Hydrocarbon Acrylates with the Dye in "FLUORINERT" Solvents The latices in EXAMPLES VI–IX comprise a highly fluorinated polyacrylate chains copolymerized with hydrocarbon monomers. The hydrocarbon monomers comprise less than 20%, e.g., from 10 to 15% by weight of the copolymers.

EXAMPLE VI

FC-16—Orange Polymeric Dye Toner

A mixture comprising the monomers PcHA (undecafluorocyclohexlymethyl acrylate) (15 g), TFA (2,2,2-trifluoroethyl acrylate) (8 g), and acetoacetoxyethyl methacrylate (2 g), and ORANGEAZO dye (2 g) was agitated until the dye dissolved completely. The mixture was then mixed with a solution of FMAC-1 (10 g of a 50% solution) in "FLUORINERT" "FC-75" solvent (400 mL), and emulsified in the presence of "FC-430" surfactant (1 g). The charge director, "ZIRCONIUM HEX-CEM" (12% $Zr^{4+}$ content; Mooney Chemical, Cleveland, Ohio) (1.5 g), was added during the emulsification process. An initiator ("TRIGONOX 21C") (1 g) was added. The reaction was conducted at a temperature of 70° C. in a 3-necked reaction flask fitted with a nitrogen inlet, a thermometer, and a water-cooled reflux condenser. After 24 hours, the reaction mixture was taken, and coagulum (less than 2 g) was skimmed off.

The toner had very low conductivity (6 picomho/cm), and the optical density of the image was 0.15. In this example and in EXAMPLES VII and IX, the toner was elecroplated at voltages ranging from 100–500 V for periods of time ranging from 30 seconds to 2 minutes onto a photoconductor strip having a silicone release layer to form an electroplate film. The electroplated film was treated as the image. The electroplated film was not transferred from the release layer.

EXAMPLE VII

FC-21—Orange Polymeric Dye Toner

A procedure substantially identical to that for preparing FC-16—Orange Polymeric Dye Toner was used, except the following mixture of monomers was used: perfluorooctyl acrylate (17 g), PcHA (undecafluorocyclohyxylmethyl acrylate) (5 g), acetoacetoxyethyl methacrylate (2 g).

The latex had a conductivity of 72 picomho/cm and a particle size of 380 nm. The optical density of the image was 0.3.

EXAMPLE VIII

FC-16—Yellow Polymeric Dye Toner

A procedure substantially identical to that for preparing FC-16—Orange Polymeric Dye Toner was used, with the exception that ORANGEAZO was replaced by MAQ (2 g). The color was very poor and no further characterization was made.

EXAMPLE IX

FC-21—Cyan Polymeric Dye Toner

A procedure substantially identical to that used for preparing FC-15—Orange Polymeric Dye Toner was used, except that the following mixture of monomers was used: FOA (17 g), PcHA (5 g), and AAMA (3 g), and CYANAQ (1 g).

The following table summarizes the particle size and conductances of the toners described.

TABLE 1

| Polymeric Dye Toner | Mean particle[1] diameter (nm) | Conductance[2] (Picomho/cm) |
|---|---|---|
| FC-15-Yellow | 565 (narrow) | 120 |
| FC-16-Yellow | 462 ± 92 nm | 11 |
| FC-19-Yellow | 495 (narrow) | 215 |
| FC-15-Orange | 777 (narrow) | 8 |
| FC-21-Orange | 380 ± 89 | 72 |
| FC-15-Cyan | 861 (narrow) | 46 |
| FC-21-Cyan | | 70 |

[1]The particle diameters were measured using a Coulter N4MD Submicron Particle Analyzer (the particle sizes deduced from the diffusion coefficients obtained by Dynamic Light scattering)
[2]The conductance was measured on a Scientifica Model 627 AC Conductivity meter (Scientifics, Princeton, N.J.)

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A composition comprising a highly fluorinated solvent and a polymeric dye represented by the formula $\{FMAC\}_x\{CCS\}_{1-x}$, wherein FMAC represents macromeric moieties which comprise fluorine in amounts from about 40 to about 75% by weight and which render said polymeric dye dispersible in the highly fluorinated solvent, CCS represents chromophore-containing moieties, x represents the weight fraction of said macromeric moieties in said polymeric dye, and x ranges from 0.15 to about 0.9.

2. The composition of claim 1 wherein CCS comprises moieties derived from (a) at least one free radically polymerizable monomer containing a chromophore that is covalently linked to said monomer and (b) optionally, at least one essentially colorless free radically polymerizable monomer.

3. The composition of claim 2 wherein said monomer (a) is represented by the formula

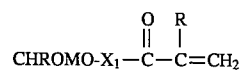

wherein CHROMO represents a dye moiety derivable from a dye selected from the group consisting of hydrazone, anthaquinone, azo, metal-azo, azomethine, metal-azomethine, aminostyryl, phthalocyanine, and indoaniline dyes; $X_1$ represents either an oxygen atom or an -N-R moiety, wherein R represents hydrogen, an alkyl group having from 1 to 18 carbon atoms, or aryl group having from 6 to 18 carbon atoms in the ring thereof.

4. The composition of claim 1, wherein FMAC is derived from a fluorinated macromer having a molecular weight of from about 5,000 g/mole to about 500,000 g/mole.

5. The composition of claim 4, wherein said fluorinated macromer is derived from a fluofinated polymer selected from the group consisting of fluorinated alkenes, fluorinated acrylates, fluorinated methacrylates, fluorinated alkyl acrylonitriles, and fluroroalkyl vinyl ethers.

6. The composition of claim 5, wherein said fluorinated polymer is perfluorinated.

7. The composition of claim 4, wherein said fluorinated macromer contains up to 3% of a non-fluorinated free radically polymerizable monomer.

8. The composition of claim 7, wherein said non-fluorinated free radically polymerizable monomer is a charge-directing metal chelating monomer.

9. The composition of claim 1, wherein FMAC is derived from a fluorinated macromer having a molecular weight of from about 5,000 g/mole to about 125,000 g/mole.

10. The composition of claim 1, wherein said highly fluorinated solvent is selected from the group consisting of highly fluorinated species of alkanes, ethers, arenes, alkarenes, aralkanes, alkenes, and alkynes.

11. The composition of claim 1, wherein said highly fluorinated solvent comprises at least 60% by weight fluorine, based on the weight of the solvent.

12. The composition of claim 1, wherein said composition is a latex.

13. The composition of claim 1, wherein said highly fluorinated solvent has a boiling point ranging from about 70° C. to about 140° C.

14. The composition of claim 1, wherein said polymeric dye bears an electrostatic charge.

15. The composition of claim 14, wherein said electrostatic charge is effected by complexation with a multivalent ion.

16. The composition of claim 15, wherein said multivalent ion is $Zr^{4+}$.

17. The composition of claim 2, further comprising a release material.

18. The composition of claim 17, wherein said release material comprises silicone.

19. A process for preparing a composition comprising a polymeric dye dispersed in a highly fluorinated solvent wherein the process comprises the steps of:
(1) combining in a highly fluorinated solvent (a) at least one monomer capable of free radical polymerization, which at least one monomer (a) contains a chromophore that is covalently linked to the polymerizable monomer (a), (b) at least one monomer capable of free radical polymerization, which at least one monomer (b) does not contain a chromophore, and (c) at least one macromer that comprises fluorine in amounts from about 40 to about 75% by weight and that is dispersible in said highly fluorinated solvent, to form a mixture,
(2) emulsifying the mixture of step (1) to form an emulsion in said highly fluorinated solvent, and
(3) free radically polymerizing the polymerizable components of the emulsion formed in step (2) in the presence of a metal cation.

20. The process of claim 19, wherein said monomer (a) is selected from the group consisting of acrylate monomers, methacrylate monomers, and vinyl monomers.

21. The process of claim 19, wherein said monomer (b) is selected from the group consisting of 4-vinylpyridine, 1-vinyl imidazole, 4-vinyl bipyridine, 4-vinyl-4'-methyl bipyridine, 3-vinylbenzylacetylacetone, 3-allylacetylacetone, acetoacetoxyalkyl acrylates, acetoacetoxyalkyl methacrylates, 5-methacryloxymethyl-8-hydroxyquinoline, N-vinylbenzyliminodiacetic acid, 18-vinyl-5,6-benzo-4,7,13,16,21, 24-hexaoxa-1,10-diazabicyclohexa-cos-2-ene, styrene, p-chlorostyrene, methylstryenes, non-halogenated vinyl ethers, halogenated vinyl ethers, and halogenated vinyl esters.

22. The process of claim 19, wherein said monomer (b) is capable of chelating with a metal.

23. The process of claim 19, wherein a co-solvent is present along with said highly fluorinated solvent wherein the co-solvent is miscible with the highly fluorinated solvent.

24. The process of claim 19, wherein said macromer is a highly fluorinated macromer having a molecular weight in the range of from about 5,000 grams/mole to about 500,000 grams/mole.

25. The process of claim 19, wherein said macromer is a highly fluorinated macromer having a molecular weight in the range of from about 5,000 grams/mole to about 125,000 grams/mole.

26. The process of claim 19, wherein said highly fluorinated solvent comprises a member selected from the group consisting of highly fluorinated species of alkanes, ethers, arenes, alkarenes, aralkanes, alkenes, and alkynes.

27. The process of claim 19, wherein said metal cation is $Zr^{4+}$.

28. The process of claim 19, wherein said mixture further includes (d) at least one highly fluorinated surfactant.

29. The process of claim 28, wherein said mixture further includes at least three highly fluorinated surfactants.

30. A process for preparing a composition comprising a polymeric dye dispersed in a highly fluorinated solvent wherein the process comprises the steps of:
(1) combining in a highly fluorinated solvent (a) at least one monomer capable of free radical polymerization, which at least one monomer (a) contains a chromophore that is covalently linked to the polymerizable monomer (a) and at least one macromer that comprises fluorine in amounts from about 40 to about 75% by weight and that is dispersible in said highly fluorinated solvent, to form a mixture,
(2) emulsifying the mixture of step (1) to form an emulsion in said highly fluorinated solvent, and
(3) free radically polymerizing the polymerizable components of the emulsion formed in step (2) in the presence of a metal cation.

31. The process of claim 30, wherein said monomer (a) is selected from the group consisting of acrylate monomers, methacrylate monomers, and vinyl monomers.

32. The process of claim 30, wherein a wherein a co-solvent is present along with said highly fluorinated solvent wherein the co-solvent is miscible with the highly fluorinated solvent.

33. The process of claim 30, wherein said macromer is a highly fluorinated macromer having a molecular weight in the range of from about 5,000 grams/mole to about 500,000 grams/mole.

34. The process of claim 30, wherein said macromer is a highly fluorinated macromer having a molecular weight in the range of from about 5,000 grams/mole to about 125,000 grams/mole.

35. The process of claim 30, wherein said highly fluorinated solvent comprises a member selected from the group consisting of highly fluorinated species of alkanes, ethers, arenes, alkarenes, aralkanes, alkenes, and alkynes.

36. The process of claim 30, wherein said metal cation is $Zr^{4+}$.

37. The process of claim 30, wherein said mixture further includes at least one highly fluorinated surfactant.

38. The process of claim 37, wherein said mixture further includes at least three highly fluorinated surfactants.

39. A process for preparing a composition comprising a polymeric dye dispersed in a highly fluorinated solvent wherein the process comprises the steps of:

(1) combining in a highly fluorinated solvent (a) at least one monomer capable of free radical polymerization, which at least one monomer (a) contains a chromophore that is covalently linked to the polymerizable monomer (a), (b) at least one highly fluorinated monomer capable of free radical polymerization, which at least one monomer (b) does not contain a chromophore, and (c) at least one highly fluorinated surfactant to form a mixture, provided that monomer (a), monomer (b), or both, provide a sufficient number of fluorinated carbon atoms to render said polymeric dye dispersible in a highly fluorinated solvent.

(2) emulsifying the mixture of step (1) to form an emulsion is said highly fluorinated solvent, and (3) free radically polymerizing the polymerizable components of the emulsion formed in step (2) in the presence of a metal cation.

40. The process of claim 39, wherein said monomer (a) is selected from the group consisting of acrylate monomers, methacrylate monomers, and vinyl monomers.

41. The process of claim 39, wherein said monomer (b) is capable of chelating with a metal.

42. The process of claim 39, wherein a wherein a co-solvent is present along with said highly fluorinated solvent wherein the co-solvent is miscible with the highly fluorinated solvent.

43. The process of claim 39, wherein said highly fluorinated solvent comprises a member selected from the group consisting of highly fluorinated species of alkanes, ethers, arenes, alkarenes, aralkanes, alkenes, and alkynes.

44. The process of claim 39, wherein said metal cation is $Zr^{4+}$.

* * * * *